United States Patent
Kerr et al.

(10) Patent No.: US 8,738,024 B1
(45) Date of Patent: May 27, 2014

(54) DELIVERING CONTENT WITHIN A BOUNDARY WITH BEACONS

(75) Inventors: Michael A. Kerr, Reno, NV (US); David Stewart, Stateline, NV (US)

(73) Assignee: NEXRF, Corp., Reno, NV (US)

( * ) Notice: Subject to any disclaimer, the term of this patent is extended or adjusted under 35 U.S.C. 154(b) by 391 days.

(21) Appl. No.: 12/821,852

(22) Filed: Jun. 23, 2010

Related U.S. Application Data

(63) Continuation-in-part of application No. 12/413,547, filed on Mar. 28, 2009.

(60) Provisional application No. 61/223,565, filed on Jul. 7, 2009, provisional application No. 61/040,661, filed on Mar. 29, 2008.

(51) Int. Cl.
*H04W 64/00* (2009.01)
*H04B 7/00* (2006.01)
*G01S 3/02* (2006.01)

(52) U.S. Cl.
USPC ............................. 455/456; 342/458; 370/310

(58) Field of Classification Search
USPC .......... 463/40, 42, 43, 20; 342/127, 457–458; 455/435.1, 414.1, 456.1; 705/14.45, 705/14.52, 14.64; 370/310
See application file for complete search history.

(56) References Cited

U.S. PATENT DOCUMENTS

| | | |
|---|---|---|
| 4,339,798 A | 7/1982 | Hedges et al. |
| 4,856,787 A | 8/1989 | Itkis |
| 5,586,937 A | 12/1996 | Menashe |
| 5,594,491 A | 1/1997 | Hodge et al. |
| 5,630,757 A | 5/1997 | Gagin et al. |
| 5,643,086 A | 7/1997 | Alcorn et al. |
| 5,738,583 A | 4/1998 | Comas et al. |
| 5,761,416 A | 6/1998 | Mandal et al. |
| 5,762,552 A | 6/1998 | Vuong et al. |

(Continued)

FOREIGN PATENT DOCUMENTS

FI    WO2008065257 A1    6/2008

OTHER PUBLICATIONS

"Internet Industry Interacting Gambling Code: A Code for Industry Co-Regulation in the Area of Internet Gambling Content Pursuant to the Requirements of the Interactive Gaming Act of 2001". Internet Industry Association. Dec. 2001.

(Continued)

*Primary Examiner* — Dmitry Suhol
*Assistant Examiner* — Jason Yen
(74) *Attorney, Agent, or Firm* — Michael A. Kerr; Kerr IP Group, LLC

(57) ABSTRACT

A system and method for delivering content within a boundary is described. The system includes a plurality of beacons, a location positioning module, and a networked component. The beacons transmit a signal containing identifying information. The location positioning module receives the beacon signal data communication from a wireless device. The location positioning module receives measured reference points that include a measured beacon identifier and a measured signal strength. The location positioning module uses the measured reference points to generate calculated signal strength values for at least one detected beacon, wherein some of the calculated signal strength values are associated with a geographic boundary. The location positioning module determines the location of the wireless device by comparing the beacon signal data to the calculated signal strength values. The networked component transmits to the wireless device a content item associated with the geographic boundary when the wireless device is within the geographic boundary.

20 Claims, 6 Drawing Sheets

(56) References Cited

U.S. PATENT DOCUMENTS

| | | | |
|---|---|---|---|
| 5,768,382 | A | 6/1998 | Schneier et al. |
| 5,779,545 | A | 7/1998 | Berg et al. |
| 5,800,268 | A | 9/1998 | Molnick |
| 5,851,149 | A | 12/1998 | Xidos et al. |
| 5,871,398 | A | 2/1999 | Schneier et al. |
| 5,902,983 | A | 5/1999 | Crevalt et al. |
| 5,971,849 | A | 10/1999 | Falciglia |
| 6,001,016 | A | 12/1999 | Walker et al. |
| 6,010,404 | A | 1/2000 | Walker et al. |
| 6,106,396 | A | 8/2000 | Alcorn et al. |
| 6,142,876 | A | 11/2000 | Cumbers |
| 6,178,510 | B1 | 1/2001 | O'Connor et al. |
| 6,259,405 | B1* | 7/2001 | Stewart et al. ................. 342/457 |
| 6,327,535 | B1 | 12/2001 | Evans et al. |
| 6,409,602 | B1 | 6/2002 | Wiltshire et al. |
| 6,500,068 | B2 | 12/2002 | Walker et al. |
| 6,508,709 | B1 | 1/2003 | Karmarker |
| 6,508,710 | B1 | 1/2003 | Paravia et al. |
| 6,527,638 | B1 | 3/2003 | Walker et al. |
| 6,575,834 | B1 | 6/2003 | Lindo |
| 6,612,928 | B1 | 9/2003 | Bradford et al. |
| 6,628,939 | B2 | 9/2003 | Paulsen |
| 6,676,522 | B2 | 1/2004 | Rowe |
| 6,682,421 | B1 | 1/2004 | Rowe et al. |
| 6,709,333 | B1 | 3/2004 | Bradford et al. |
| 6,709,631 | B2 | 3/2004 | Mori et al. |
| 6,719,631 | B1 | 4/2004 | Tulley et al. |
| 6,749,512 | B2 | 6/2004 | MacGregor et al. |
| 6,782,253 | B1* | 8/2004 | Shteyn et al. ............. 455/414.1 |
| 6,834,195 | B2 | 12/2004 | Brandenberg et al. |
| 6,875,110 | B1 | 4/2005 | Crumby |
| 6,879,838 | B2 | 4/2005 | Rankin et al. |
| 6,884,162 | B2 | 4/2005 | Raverdy et al. |
| 6,942,574 | B1 | 9/2005 | LeMay et al. |
| 7,035,651 | B2 | 4/2006 | Schreiner et al. |
| 7,076,243 | B2 | 7/2006 | Parupudi et al. |
| 7,107,245 | B1 | 9/2006 | Kowalick |
| 7,136,915 | B2 | 11/2006 | Rieger, III |
| 7,196,662 | B2 | 3/2007 | Misikangas et al. |
| 7,209,752 | B2 | 4/2007 | Myllymaki et al. |
| 7,213,048 | B1 | 5/2007 | Parupudi et al. |
| 7,218,941 | B1 | 5/2007 | Kubo et al. |
| 7,228,136 | B2 | 6/2007 | Myllymaki et al. |
| 7,299,059 | B2 | 11/2007 | Misikangas et al. |
| 7,338,372 | B2 | 3/2008 | Morrow et al. |
| 7,341,522 | B2 | 3/2008 | Yamagishi |
| 7,349,683 | B2 | 3/2008 | Misikangas et al. |
| 7,359,714 | B2 | 4/2008 | Parupudi et al. |
| 7,397,424 | B2 | 7/2008 | Houri |
| 7,450,954 | B2 | 11/2008 | Randall |
| 7,493,565 | B2 | 2/2009 | Parupudi et al. |
| 7,529,639 | B2 | 5/2009 | Rasanen et al. |
| 7,534,169 | B2 | 5/2009 | Amaitis et al. |
| 7,611,407 | B1 | 11/2009 | Itkis et al. |
| 8,029,349 | B2 | 10/2011 | Lind |
| 2001/0004768 | A1 | 6/2001 | Hodge et al. |
| 2001/0005908 | A1 | 6/2001 | Hodge et al. |
| 2001/0036224 | A1 | 11/2001 | Demello et al. |
| 2002/0002073 | A1 | 1/2002 | Montgomery et al. |
| 2002/0007494 | A1 | 1/2002 | Hodge |
| 2002/0056125 | A1 | 5/2002 | Hodge et al. |
| 2002/0056143 | A1 | 5/2002 | Hodge et al. |
| 2002/0077167 | A1 | 6/2002 | Merari |
| 2002/0091568 | A1 | 7/2002 | Kraft et al. |
| 2002/0142815 | A1 | 10/2002 | Candelore |
| 2002/0142844 | A1 | 10/2002 | Kerr |
| 2002/0144151 | A1 | 10/2002 | Shell et al. |
| 2003/0032409 | A1 | 2/2003 | Hutcheson et al. |
| 2005/0046608 | A1* | 3/2005 | Schantz et al. ................. 342/127 |
| 2005/0048990 | A1 | 3/2005 | Lauriol |
| 2005/0181804 | A1 | 8/2005 | Misikangas et al. |
| 2006/0125693 | A1* | 6/2006 | Recker ......................... 342/458 |
| 2006/0189382 | A1 | 8/2006 | Muir et al. |
| 2007/0024580 | A1 | 2/2007 | Sands et al. |
| 2007/0087834 | A1* | 4/2007 | Moser et al. ..................... 463/42 |
| 2007/0136132 | A1* | 6/2007 | Weiser et al. ................... 705/14 |
| 2007/0149215 | A1 | 6/2007 | Misikangas |
| 2007/0149216 | A1 | 6/2007 | Misikangas |
| 2007/0168127 | A1 | 7/2007 | Zaruba et al. |
| 2007/0184852 | A1* | 8/2007 | Johnson et al. ............. 455/456.1 |
| 2007/0257831 | A1 | 11/2007 | Mathews et al. |
| 2007/0270212 | A1* | 11/2007 | Cockerille et al. .............. 463/29 |
| 2007/0281692 | A1* | 12/2007 | Bucher et al. .............. 455/435.1 |
| 2008/0026844 | A1* | 1/2008 | Wells .............................. 463/39 |
| 2008/0032705 | A1 | 2/2008 | Patel et al. |
| 2008/0057894 | A1* | 3/2008 | Aleksic et al. ............. 455/187.1 |
| 2008/0085692 | A1 | 4/2008 | Hart et al. |
| 2008/0097858 | A1 | 4/2008 | Vucina et al. |
| 2008/0162037 | A1 | 7/2008 | Hasan |
| 2008/0166973 | A1 | 7/2008 | Hart et al. |
| 2008/0167106 | A1* | 7/2008 | Lutnick et al. .................. 463/16 |
| 2008/0186234 | A1 | 8/2008 | Alles et al. |
| 2008/0249833 | A1* | 10/2008 | Ali et al. ......................... 705/10 |
| 2008/0281668 | A1* | 11/2008 | Nurminen ....................... 705/10 |
| 2009/0213771 | A1* | 8/2009 | Celentano et al. ............ 370/310 |
| 2010/0027521 | A1 | 2/2010 | Huber et al. |
| 2010/0121567 | A1 | 5/2010 | Mendelson |
| 2010/0302056 | A1 | 12/2010 | Dutton et al. |
| 2010/0305855 | A1 | 12/2010 | Dutton et al. |
| 2010/0331016 | A1 | 12/2010 | Dutton et al. |
| 2011/0103360 | A1 | 5/2011 | Ku et al. |

OTHER PUBLICATIONS

Wirelss Network. Wikipedia. http://en.wikipedia.org/wiki/Wireless_network. Nov. 17, 2008.
"Tracking Cookie." Wikipedia. http://en.wikipedia.org/wiki/Tracking_cookie. May 24, 2009.
Blom et al. "Transmission Power Measurements for Wireless Sensor Nodes and their Relationship to Battery Level." Symposium on Wireless Communication Systems. pp. 342-345, Sep. 7, 2005.
"Wi-Fi Location-Based Services—Design and Deployment Considerations." 2006 Cisco Systems. Accessed Dec. 2008. https://learningnetwork.cisco.com/docs/DOC-3418.
"Location in SIP/IP Core Architecture." Open Mobile Alliance. Sep. 4, 2008. Accessed Dec. 2008. http://www.openmobilealliance.org/technical/release_program/locsip_archive.aspx.
Want et al. "The Active Badge Location System." ACM Transactions on Office Information Systems (TOIS) vol. 10. No. 1, pp. 91-102, Jan. 1992.
Youssef et al. "Location-Clustering Techniques for WLAN Location Determination Systems." 2006. http://wrc.ejust.edu.eg/papers/ijca.pdf.
Vegni et al. "Local Positioning Services on IEEE 802.11 Networks." Radio Engineering, pp. 42-47, vol. 17, No. 2, Jun. 2008.
Ladd et al. "On the Feasibility of Using Wireless Ethernet for Indoor Localization." IEEE Transactions on Robotics and Automation, pp. 555-559, vol. 20, Issue 3, No. 3, Jun. 2004.
Ladd et al. "Using Wireless Ethernet for Localization." IEEE/RJS International Conference on Intelligent Robots and Systems. 2002.
Kitasuka et al. "Positioning Technique of Wireless LAN Terminal Using RSSI between Terminals". Jun. 2005. Accessed Dec. 2008. http://www.techrepublic.com/whitepapers/positioning-technique-of-wireless-lan-terminals-using-rssi-between-terminals/330959.
Lafargue, Edouard. "Wireless Network Audits using Open Source Tools". SANS Institute 2003. Accessed Dec. 2008. http://www.sans.org/reading_room/whitepapers/auditing/wireless-network-audits-open-source-tools_1235.
Heidari, Mohannad. "A Testbed for Real-Time Performance Evaluation of RSS-Based Indoor Geolocation Systems in a Laboratory Environment". Apr. 21, 2005. Accessed Dec. 2008. https://www.wpi.edu/Pubs/ETD/Available/etd-050407-112549/unrestricted/massad.pdf.
Li et al. "A New Method for Yielding a Database of Location Fingerprints in WLAN" IEE Communications Proceedings, pp. 580-586, vol. 152, Issue 5, Oct. 7, 2005.
Sakata et al. "An efficient algorithm for Kriging approximation and optimization with large-scale sampling data". Computer Methods in Applied Mechanics and Engineering. vol. 193, Issues 3-5, pp. 385-404, Jan. 23, 2004.

(56) References Cited

OTHER PUBLICATIONS

Muthukrishnan, et al. "Sensing motion using spectral and spatial analysis of WLAN RSSI." Proceedings of the 2nd European conference on Smart sensing and context. 2007. pp. 62-76.
Capkun et al. "Mobility Helps Peer-to-Peer Security." IEEE Transactions on Mobile Computing. vol. 5, Issue 1, pp. 43-51, Jan. 2006.
Milojicic et al. "Peer-to-Peer Computing" Jul. 10, 2002. https://www.hpl.hp.com/techreports/2002/HPL-2002-57R1.pdf.
"The New Normal of Retailing: The Rise of the Mobile Shopper." Next Generation Retail Summit. 2010. http://www.ngrsummit.com/media/whitepapers/Microsoft_NGRUS.pdf.
Lamarca et al. "Place Lab: Positioning Using Radio Beacons in the Wild." Pervasive 2005, LNCS 3468, pp. 116-133, 2005.
Borriello et al. "Delivering Real-World Ubiquitous Location Systems." Communications of the ACM. pp. 36-41, vol. 48, Issue 3, Mar. 2005.
Schilit et al. "Challenge: Ubiquitous Location-Aware Computing and the "Place Lab" Initiative." WMASH Proceedings of the 1st ACM International Workshop on Wireless Mobile Applications and Services on WLAN Hotspots. 2003.
Hightower et al. "Practical Lessons from the Place Lab." IEEE Pervasive Computing. pp. 32-39, vol. 5, Issue 3, Jul.-Sep. 2006.
Hile et al. "Indoor Location Estimation with Placelab." http://www.cs.washington.edu/education/courses/cse590gb/04wi/projects/hile-liu/. Jan. 8, 2004. Accessed on Sep. 25, 2008.
Kang "Extracting Places from Traces of Locations." ACM SIGMOBILE Mobile Computing and Communications Review. vol. 9, Issue 3, Jul. 2005.
Lamarca et al. "Self-Mapping in 802.11 Location Systems." UbiComp 2005: Ubiquitous Computing Lecture Notes in Computer Science, 2005, vol. 3660/2005, 903, DOI: 10.1007/11551201_6.
Otsason et al. "Accurate GSM Indoor Localization." Ubiquitous Computing 2005, LNCS 3660, pp. 141-158, 2005.
Chen et al. "Practical Metropolitan-Scale Positioning for GSM Phone." UbiComp 2006: Ubiquitous Computing Lecture Notes in Computer Science, 2006, vol. 4206/2006, pp. 225-242.
Varshavsky et al. "Are GSM Phones the Solution for Localization?" 7th IEEE Workshop on Mobile Computing Systems and Applications, 2006. pp. 34-42, Aug. 1, 2005.
Chawathe et al. "A Case Study in Building Layered DHT Applications." Proceedings of the 2005 conference on Applications, technologies, architectures, and protocols for computer communications. vol. 35, Issue 4, Oct. 2005.
Lamarca et al. "Finding Yourself: Experimental location technology relies on Wi-Fi and cellphone signals instead of orbiting satellites." Dec. 2004. http://spectrum.ieee.org/computing/networks/finding-yourself.
Letchner et al. "Large-Scale Localization from Wireless Signal Strength." In Proceedings of the National Conference on Artificial Intelligence (AAAI), 2005.
Welbourne et al. "Mobile Context Inference Using Low-Cost Sensors." Location and Context-Awareness Lecture Notes in Computer Science, 2005, vol. 3479/2005, pp. 95-127.
Balakrishnan et al. "Lessons from Developing and Deploying the Cricket Indoor Location System." Nov. 7, 2003. http://www.sds.lcs.mit.edu/projects/cricket/V1Exp.pdf.
Cheng et al. "Accuracy Characterization for Metropolitan-scale Wi-Fi Localization." Proceedings of the 3rd international conference on Mobile systems, applications, and services. 2005.
"Ekahau Positioning Engine 4.2." 2008. http://www.nowire.se/images/produktblad/ekahau/datasheet_epe_42_en_11022008_lo.pdf. Sep. 29, 2008.

\* cited by examiner

US 8,738,024 B1

DELIVERING CONTENT WITHIN A BOUNDARY WITH BEACONS

CROSS-REFERENCE

This patent application claims the benefit of provisional patent application Ser. No. 61/223,565 filed Jul. 7, 2009, and this application is a continuation-in-part of non-provisional application Ser. No. 12/413,547 filed Mar. 28, 2009, which claims the benefit of provisional patent application Ser. No. 61/040,661 filed Mar. 29, 2008.

FIELD

The present invention relates to the targeted delivery of content over one or more wireless networks. More particularly, the present invention relates to a system and method for determining the location of a wireless handset relative to a predefined boundary and delivering content to the handset when it is located within the boundary.

BACKGROUND

The wireless handset presents new opportunities for merchants to communicate with customers. The merchant may wish to provide information to the customer regarding a product or service, offer incentives to the customer to enter a premises or make a purchase, or provide services that utilize the capabilities of the wireless handset.

When a merchant premises is large or the merchant offers a complex variety of products, the customer may require assistance to find a desired product or to attain the information needed about a product to make a purchase decision. An employee of the merchant may be able to provide the needed assistance provided the employee's training and knowledge are sufficient. If the employee is not available or unable to assist, the customer may use a web browser on a wireless handset to find additional information about a desired product or service. However, the small display and interface format of a wireless handset may hinder the customer's effort to use a wireless handset to find information. Thus, there is a need for a custom interface specific to the merchant's offerings, allowing the merchant to provide information to the customer in an efficient and easily navigable fashion.

A merchant wishing to advertise to the customer may wish to leverage the functionality of the customer's wireless handset by providing highly targeted advertising to the user. Although a merchant may use a sign or an LCD display to provide advertising at a specific location on the merchant premises, these advertising mechanisms will typically be directed at the entire range of potential customer demographics, due to the inability of these mechanisms to distinguish among customers. There is a need for a platform allowing the merchant to provide advertising to the customer taking into account the customer's location on or near the merchant premises and personal information about the customer which the customer has chosen to make available to the merchant.

Merchants having loyalty programs or other programs to increase interactions with the customer may rely on postal mail or e-mail to communicate with customers. However, the merchant lacks a means to incorporate the program into the customer experience on the merchant premises. Thus, there is a need for an application running on a wireless handset that allows a merchant to provide the benefits of the loyalty program to the customer while the customer is on or near the merchant's premises.

While the customer may realize a number of benefits from the solutions described above, the customer will be discouraged if the merchant's use of the application fails to meet the customer's needs or exceeds the customer's desire for the information that can be provided to the wireless handset. There is a need for a feedback system which allows the customer to chose or rank which of the provided information is desired and/or helpful. Such a feedback system would ensure that the customer and other future customers would continue to receive the most desirable and useful information provided by the merchant.

Further, customers may only be willing to share personal information that will allow the provided information to be targeted at the customer if the customer has control over what information is provided to the merchant. Thus, there is a need for an information privacy management system which the customer uses to control the information available to the merchant.

SUMMARY

A system for delivering content within a boundary is described. The illustrative system includes a plurality of beacons, a location positioning module, and a networked component. Each of the beacons transmits a signal containing identifying information. The location positioning module receives a beacon signal data communication from a wireless device. The beacon signal data includes a beacon received signal strength and a beacon identification for each beacon signal received at the wireless device. Additionally, the location positioning module is configured to receive a plurality of measured reference points that include a measured beacon identifier and a measured signal strength. Furthermore, the location positioning module is configured to use the measured reference points to generate a plurality of calculated signal strength values for at least one detected beacon, wherein some of the calculated signal strength values are associated with at least one geographic boundary. Further still, the location positioning module determines the location of the wireless device by comparing the beacon signal data to the plurality of calculated signal strength values. The networked component transmits to the wireless device at least one content item associated with the geographic boundary when the wireless device is within the geographic boundary.

Another illustrative system for delivering content within a boundary is also described. The system includes a plurality of beacons and a location positioning module. Each of the beacons transmits a signal containing identifying information. The location positioning module receives a beacon signal data communication that includes a beacon received signal strength and a beacon identification for each beacon signal received by a wireless device. The location positioning module receives a plurality of measured reference points that include a measured beacon identifier and a measured signal strength. The location positioning module uses the measured reference points to generate a plurality of calculated signal strength values for at least one detected beacon, wherein some of the calculated signal strength values are associated with at least one geographic boundary. The location positioning module determines the location of the wireless device by comparing the beacon signal data to the plurality of calculated signal strength values. The location positioning module also transmits to the wireless device at least one content item associated with the geographic boundary when the wireless device is within the geographic boundary.

A method for delivering content within a boundary is also described. The method includes receiving at a location positioning module a beacon signal data communication from a wireless device, the beacon signal data including a beacon received signal strength and a beacon identification for each beacon signal received at the wireless device. The method then proceed to receive at the location positioning module a plurality of measured reference points that include a measured beacon identifier and a measured signal strength. The location positioning module uses the measured reference points to generate a plurality of calculated signal strength values for at least one detected beacon, wherein some of the calculated signal strength values are associated with at least one geographic boundary. The location positioning module determines a location of the wireless device by comparing the beacon signal data to the plurality of calculated signal strength values. A networked component then transmits to the wireless device at least one content item associated with the geographic boundary when the wireless device is within the geographic boundary.

In another embodiment, the content item transmitted from the networked component to the wireless device is associated with at least one user attribute associated with the wireless device. In yet another embodiment, the content item transmitted from the networked component to the wireless device is associated with at least one time frame, and the content item is transmitted within the time frame. In a further embodiment, the content item is a link to another content item. In a still further embodiment, the content item is an application. In another illustrative embodiment, the boundary delineates all or part of a merchant premises. In a further illustrative embodiment, the boundary delineates an area proximate to a merchant premises.

FIGURES

The present invention will be more fully understood by reference to the following drawings which are for illustrative, not limiting, purposes.

DETAILED DESCRIPTION

Figure 1:
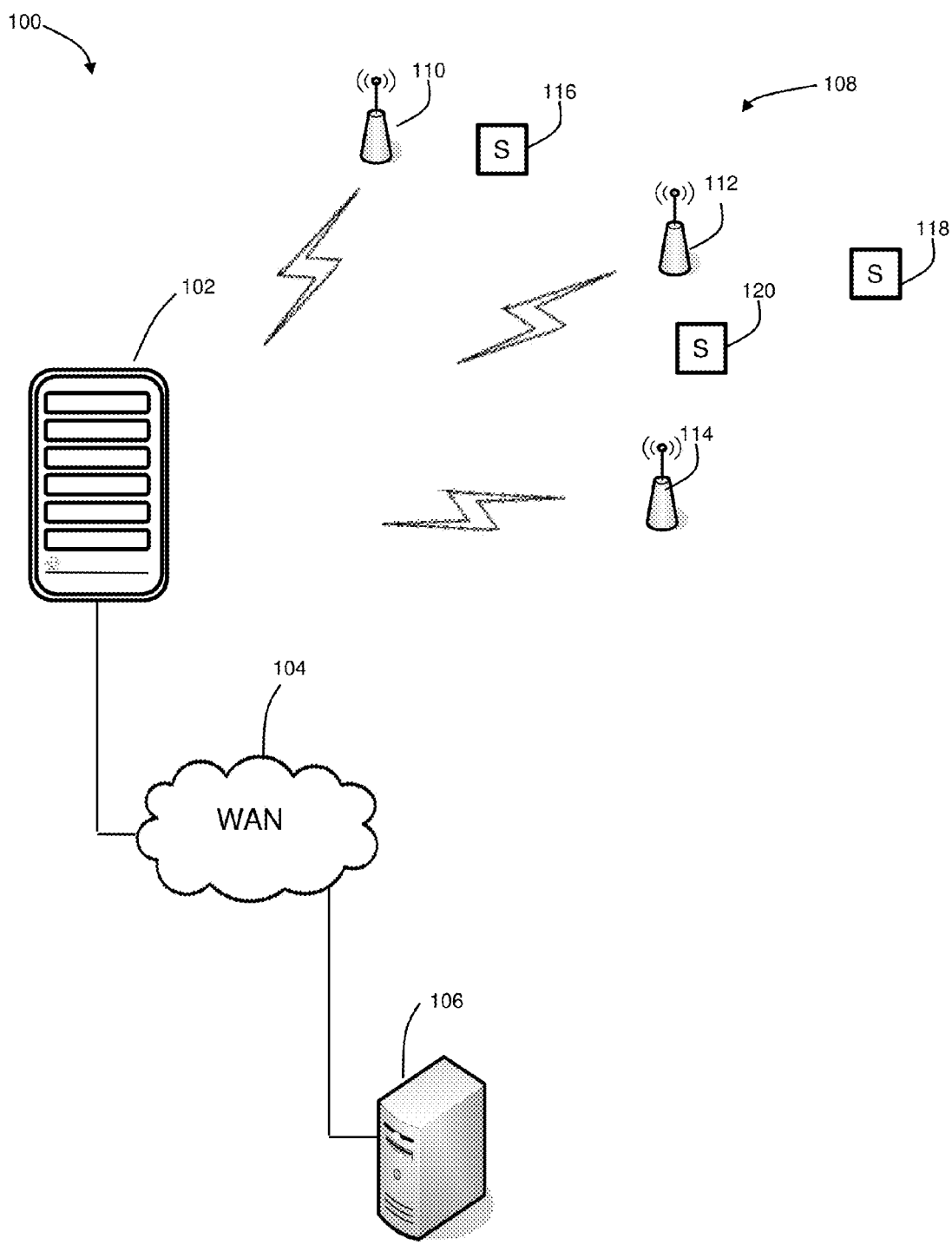
FIG. 1 shows an illustrative system architecture for the Mobile Autonomous Dynamic Graphical User Interface (MADGUI) Application Framework.

Persons of ordinary skill in the art will realize that the following description is illustrative and not in any way limiting. Other embodiments of the claimed subject matter will readily suggest themselves to such skilled persons having the benefit of this disclosure.

The Mobile Autonomous Dynamic Graphical User Interface (MADGUI) Application Framework enables a merchant to communicate within the geographic boundaries of the merchant premises. The term "merchant" as used below may refer to, for example, a retail establishment, service provider, vendor, hotel, casino, resort, or other commercial business. Additionally, the MADGUI Application Framework may be used in Free-Trade-Zones where information about different merchants is served up to the handset to an area beyond the merchant premises, such as the common area of a shopping mall. The goal of the MADGUI Application Framework is to communicate "links" and enable access to applications to a wireless device as a function of location, time and user preference profile.

The MADGUI Application Framework can be applied to a handset using a location positioning system such as GPS. Alternatively, the location of the handset may be determined using a custom positioning network, such as the Location Positioning Engine (LPE) described below. In some embodiments, the MADGUI Application Framework can determine and update the location of handsets on users traveling at driving speeds. The MADGUI Application Framework may further be able detect the position of a handset moving through an indoor environment at walking speeds. The MADGUI Application Framework is flexible and can operate as a stand-alone system or can be implemented as a middleware application.

The MADGUI Application Framework may be comprised of one or more of the following layers: Location Positioning Engine (LPE), Content Management System (CMS), Group Profile layer, and an Application Layer that includes a portal page referred to as the Mobile Autonomous Dynamic Graphical User Interface (MADGUI).

The MADGUI Application Framework can integrate with a merchant's wireless communications systems, e.g. Wi-Fi, merchant content management systems, and the merchant customer relations management system. Additionally, the MADGUI Application Framework solution supports building merchant-specific applications.

In operation, the merchant may elect not to use one or more layers of the MADGUI Application Framework. In a first illustrative embodiment, a simplified MADGUI Application Framework may include: extracting location information from a carrier, accessing the Content Management System, and communicating the associated content to the MADGUI; providing an autonomous mobile search solution. Associated content may include endpoint content, links to endpoint content, applications, or links to applications. The applications and links provided to the handset may be associated with a time, location, user attribute, or any combination thereof.

The MADGUI Application Framework may comprise one or more of the components presented below. The Merchant Control Plane (MCP) layer allows the merchant to associate content with location, time, and/or user attributes. The Location Positioning Engine (LPE) layer may be used to identify the location of the wireless handset. The Content Management System (CMS) layer supports the geocoding of content and creation and tear-down of geofences associated with the content, i.e. content bubbles. The Group Profile layer provides various functions including serving as a means for anonymizing the communication of content. Additionally, the Group Profile layer enables filtering of the content based on the user preference profile. Furthermore, Group Profile content can also be filtered based on a set of the Merchant's preferences. The Applications layer includes the MADGUI portal page and provides a means for communicating content to the handset in an organized and prioritized manner, without requiring input from the user. The Application layer may include merchant specific applications that may be dependent on time, location, user preference profile or any combination thereof.

The MADGUI Application Framework can be applied to a variety of different "vertical" markets. The illustrative vertical markets that are described include casino applications, food and beverage applications, retail applications, and Free-Trade-Zone applications. The Free-Trade-Zone refers to communications with the user handset outside the merchant geographic boundaries. Although illustrative vertical market applications have been described that are merchant-specific, the solutions described herein may also be applied to various enterprise applications including utilities, healthcare, environmental, military, refining and manufacturing.

The MADGUI Application Framework may be integrated with existing system architectures. Since the illustrative MADGUI Application Framework operates as a web service it may be integrated into client/server architecture or offered as a software-as-a-service web application. Additionally, the MADGUI Application Framework can be used to operate and build applications that run on a specific platform. Furthermore, the MADGUI Application Framework can operate in a peer-to-peer or hierarchical peer-to-peer environment, can use intelligent agents, and can utilize other such system architectures that are not presently widely adopted.

Referring to FIG. 1, an illustrative system architecture 100 for the MADGUI Application Framework is shown. The system comprises wireless handset 102, wireless area network (WAN) 104, server 106, and local network 108. Local network 108 comprises signal emitters 110, 112, and 114 and signal sensors 116, 118, and 120. In this patent the terms transmitters and emitters are used interchangeably, as shall be appreciated by those of ordinary skill in the art. The signal transmitters ("beacons") may be, for example, access points or femtocells. The signal sensors may be RF sensors. The sensors may be used to track the location and received signal strength profile from the beacons.

In some embodiments, hybrid units capable of both signal transmission and signal sensing are used in lieu of or in combination with units capable of only signal transmission or signal sensing. The hybrid units may be capable of simultaneous transmission (beacon mode) and signal detection (sensor mode). The switching from beacon mode to sensor mode can occur at regular intervals or may be triggered by other sensor inputs or feedback, e.g. temperature, humidity, number of people, number of RF radiators, and other such variables affecting or causing changes to the RF environment.

The wireless handset 102 receives a received signal strength indication (RSSI) from the signal transmitters and communicates the RSSI data to the server 106 via WAN 104. The server processes the RSSI values to determine the location of the wireless handset relative to the beacons. The server then transmits content to the wireless handset as a function of location, time, and/or user attributes.

Merchant Control Plane

The MADGUI Application Framework enables a merchant to control the content communicated to a wireless handset located within the merchant's geographic boundaries. Additionally, the MADGUI Application Framework enables the merchant to control the "wireless" content that is being communicated within the merchant premises as a function of location, time, user attribute, or any combination thereof. The MADGUI Application Framework also supports the development of merchant specific Applications that are dependent on time, location, user preference profile, or any combination thereof.

Location Positioning Engine (LPE)

The MADGUI Application Framework may comprise a MADGUI Location Positioning Engine (LPE). In some embodiments, the LPE makes use of RF to determine location. The RF space is highly dynamic and affected by background noise, the number of individuals in a particular location, and the number of radios/radiators. In the illustrative example presented herein, the MADGUI LPE operates in conjunction with a Wi-Fi network and also includes an RF sensor network. Alternatively, other wireless standards (e.g. CDMA, GSM, or WiMAX) can also be used. The Wi-Fi network comprises a plurality of access points. In some embodiments, femtocells may be used as access points.

Figure 2:
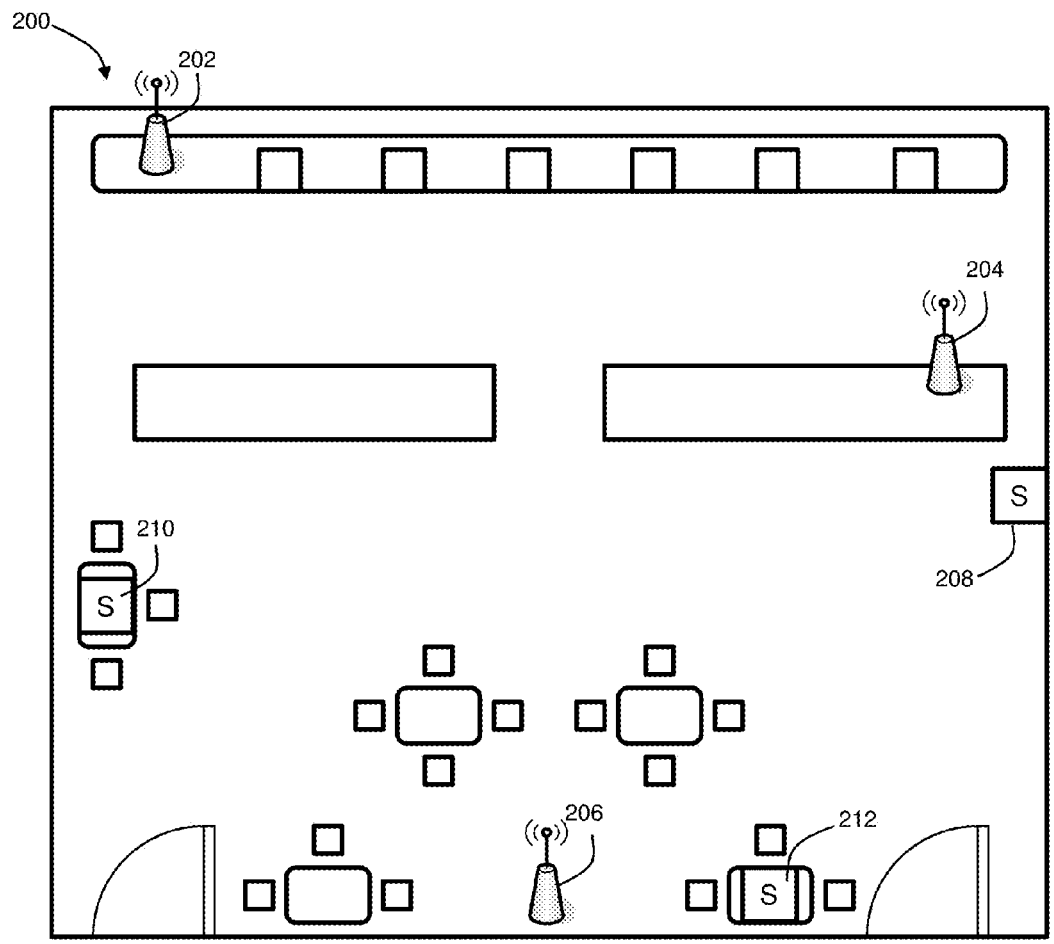
FIG. 2 shows an illustrative local network layout relative to a floor plan.

Referring to FIG. 2, an illustrative local network layout 200 is shown relative to a floor plan. The network comprises beacons 202, 204, 206 and sensors 208, 210, and 212 are shown. The network components may be mounted, for example, on a shelf or slot machine, as shown at 202 and 204; on a wall, as shown at 208; to the underside of a table, as shown at 210 and 212; ceiling mounted, as shown at 206; or mounted at any other location to accommodate the needs of signal coverage and the protection of network components. The placement of network components may be determined through an optimization process as described below.

The MADGUI LPE may comprise three (3) modes: a set-up mode, a real-time calibration mode, and a location positioning mode. The set-up mode optimizes the location of the beacons by establishing a grid, analyzing the locations for each beacon within the grid, ranking the location of the beacon based on "open space" and high traffic areas, choosing an optimal location for each beacon, and continuing the process until the cost of installing an additional beacon exceeds the value of the communications associated with the beacon. Once the optimal locations for the beacons are determined, the method proceeds to determine the optimum location for the sensors using an optimization algorithm similar to beacon optimization. In one embodiment, the operations of the beacon and the sensor are performed by the same device.

The next mode is the real-time calibration mode for the RF fingerprint model. The real-time calibration mode includes gathering an initial RF fingerprint and iteratively updating the RF fingerprint model. In general, the RF sensor RSSI data is used to generate a real-time geospatial statistical model. In the illustrative embodiment, the sensors are distributed throughout the merchant premises to collect received signal strength indication (RSSI) data; the RSSI data from each of the RF sensors is served up to the LPE and is used to generate a real-time-RF-fingerprint of the merchant premises.

The RF fingerprint model includes Measured Reference Points (MRPs) that can be generated using sensors (e.g. Wi-Fi RSSI sensors) that can relay actual measured signal strengths on a recurring and regular basis. Updates of the readings at the MRPs can be scheduled to run at specified intervals and the Virtual Reference Point (VRP) and kriging process can be triggered to run when MRPs have updated. This process provides a complete real-time-fingerprint-model for an entire area while minimizing time required for the initial survey definition process. MRP sensors can be geographically positioned on an area map with absolutely no required measurements using the Wi-Fi area mapping software. Additionally, the geographic positioning of the MRP sensors can be "optimized" with computer models that identify the optimal location for the MRP sensors.

For example, the RF fingerprint model can use the existing merchant's Wi-Fi infrastructure or any other nearby access points in most cases. In the illustrative embodiment, additional beacons can be used to augment the existing Wi-Fi landscape and enhance the LPE accuracy. Additional beacons can simply be mounted in areas of interest and then location can be quickly mapped using the LPE Mapping Utility.

The readings found at the location corresponding to the hybrid sensor/beacon module may then be uploaded as an MRP, with a value that ranges from "0" RSSI (strongest value) for the beacon's own MAC/SSID to a low value that corresponds to the RSSI from the beacon that is furthest away.

For the illustrative embodiment presented herein, there are instances while the MRPs are being collected and the modules are in "RSSI sensor" mode, that the LPE determination may have to be postponed because of the absence of beacon signals being communicated from the modules; the lack of beacon signals communicated from the modules can result in large inaccuracies when matching the RSSI fingerprints. To overcome this limitation, the hybrid sensor/beacon can operate in one mode for a predefined time interval or for a particular location, instead of combining operations for that time interval or for that location.

In operation, the RF fingerprint model generates Virtual Reference Points (VRPs) that are included in a grid of "theoretical" RSSI values that are calculated using a geospatial statistical analysis that is also referred to as "kriging." In the illustrative kriging process, a linear regression is performed on the RF sensor RSSI values, and a balanced approach is used to remove outliers affecting the regression. The result is that for each latitude, longitude, and altitude associated with each VRP, a "theoretical" RSSI value is calculated for each beacon.

Figure 3:
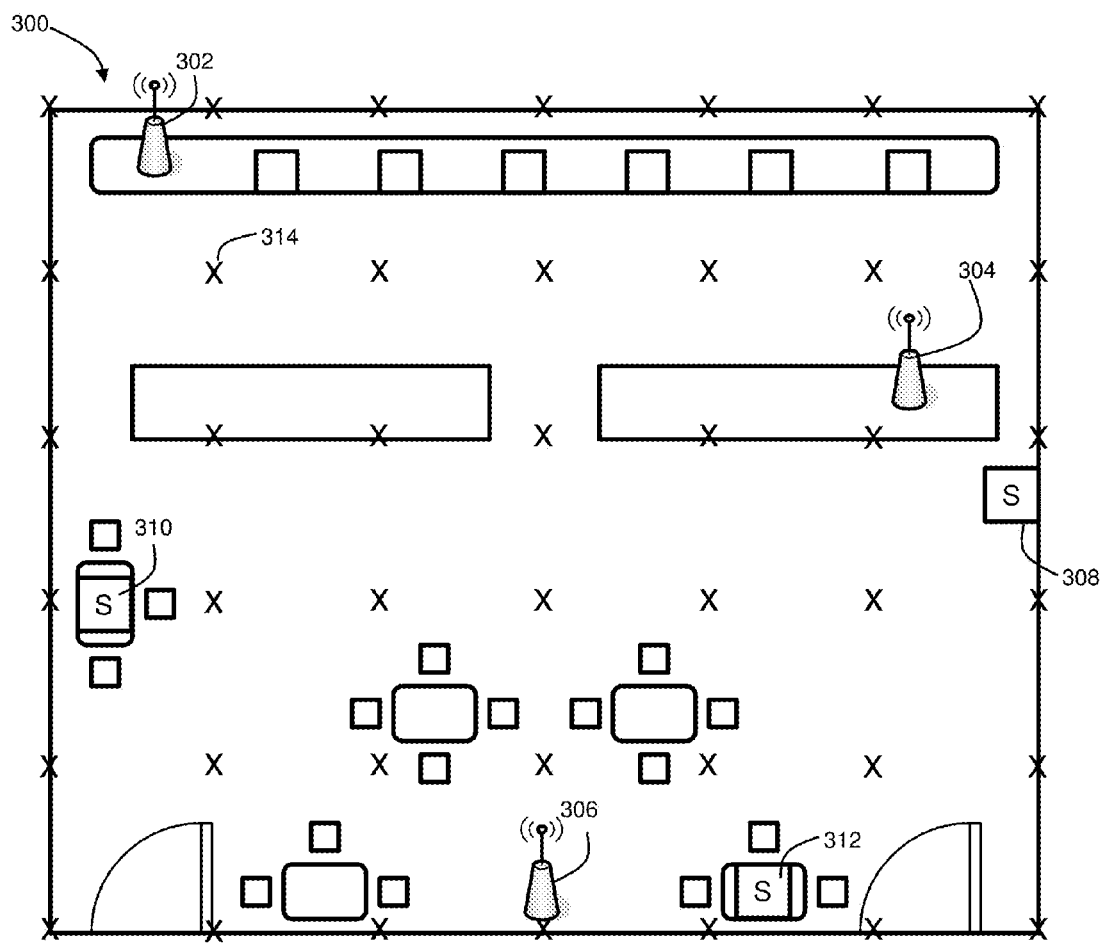
FIG. 3 shows an illustrative virtual reference point grid relative to a merchant premises.

Referring to FIG. 3, an illustrative Virtual Reference Point grid is shown relative to a merchant premises. Each VRP in the grid is indicated by an X, for example, the X indicated at 314 is a VRP. At VRP 314, as well as the other VRPs indicated in the grid, a theoretical RSSI value is calculated for each of beacons 302, 304, and 306 and each of sensors 308, 310, and 312.

In the location positioning mode, the location of the mobile handset is determined by the LPE. In an illustrative embodiment, wireless handset 102 measures RSSI information from beacons 110-114 and communicates the handset RSSI data to server 106. The LPE server receives the handset RSSI values and identifies "theoretically" calculated VRPs with similar RSSI values. A location is estimated based on the results of the comparison of handset RSSI values with the associated VRPs. The latitude, longitude, and altitude of the indoor location are subsequently identified. The LPE server(s) may be local, i.e. on the merchant property, or can be off-site on a Wide Area Network, such as the Internet.

Figure 4:
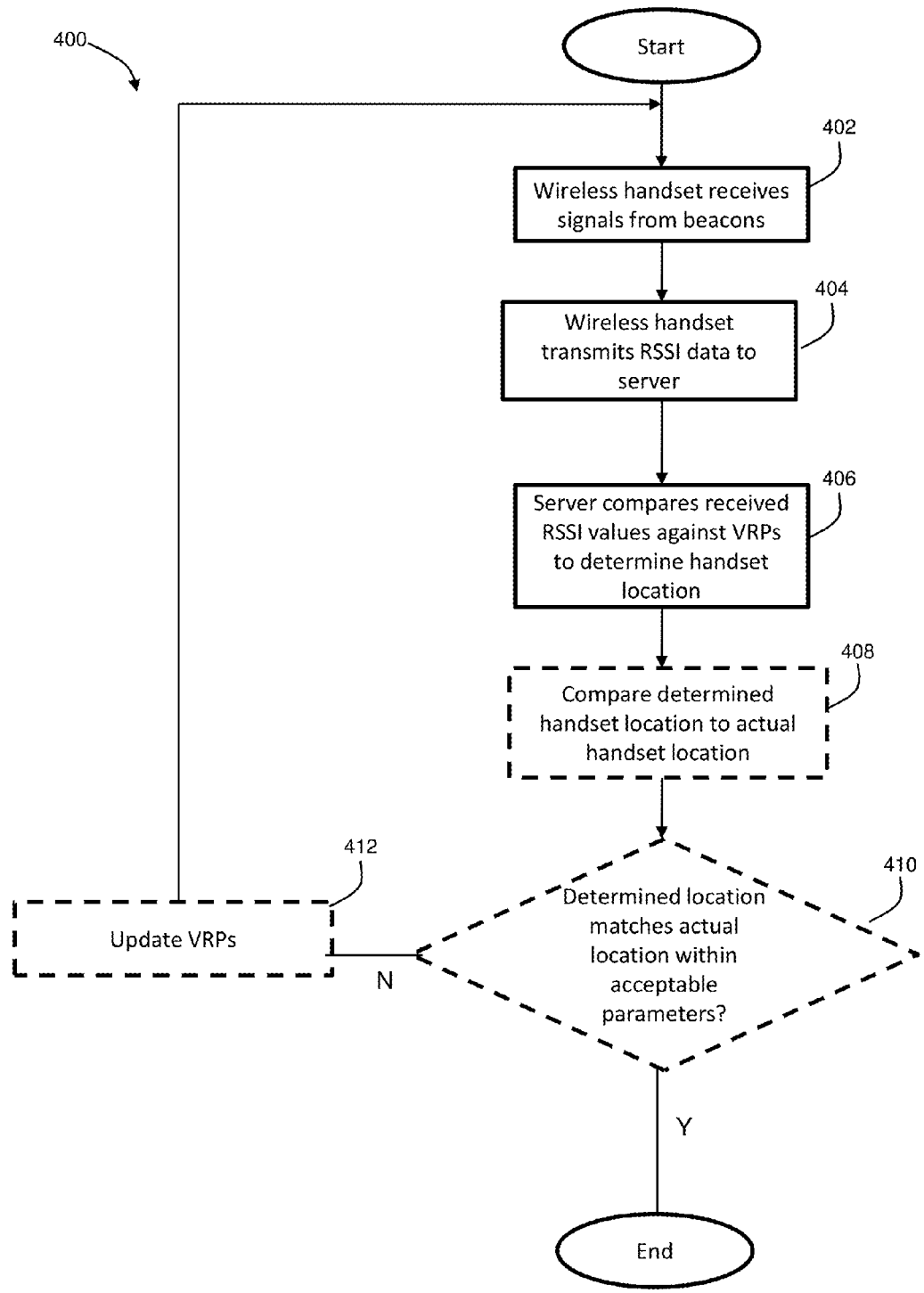
FIG. 4 shows an illustrative flow chart for detecting the location of a wireless handset within a merchant premises.

Referring to FIG. 4, an illustrative flow chart for detecting the location of a wireless handset within a merchant premises is shown. The method begins at block 402, at which the wireless handset receives RSSI information from each beacon having a sufficient signal strength for the wireless handset to detect the beacon. The method continues to block 404, at which the wireless handset communicates the RSSI data to the server. At block 406, an application running on the server estimates the location of the wireless handset based on the comparison of handset RSSI values with each VRP in the VRP group. For example, the wireless handset may be determined to be located at the VRP at which there is the least difference between VRP RSSI values and handset RSSI values. At optional block 408, the wireless handset location determined by the server is compared to the known location of the wireless handset in a test mode. At optional decision diamond 410, if the determined handset location matches the actual handset location within acceptable parameters, the method ends. However, if the determined location does not match the actual location within acceptable parameters, the VRPs are updated to reflect the data collected by the handset and the measurement is repeated, as indicated at block 412.

Additional VRP correction is performed by sensors 116, 118, and 120 in real-time, as the sensors gather information about the dynamic RF space, periodically or manually, and correct for changes to the RF space by updating the RF fingerprint model and subsequently updating the "theoretical" RSSI value associated with each Virtual Reference Point. The LPE can be easily integrated into the Content Management System described below.

Content Management System (CMS)

The Content Management System (CMS) supports the formation and tear-down of content bubbles. Content bubbles are boundaries ("geofences") surrounding all or part of an area on or proximate to a merchant premises. The merchant may associate content bubbles with "endpoint content," such as text, information, advertising, a coupon, a web page, or an application. Content bubbles may also be associated with "link content," which are links to other content, e.g. hyperlinks or menus comprised of links. In operation, when a wireless handset enters the content bubble, the handset can receive the associated link or content. Content bubbles enable the merchant to determine the type of content communicated to a predefined area within or proximate to the merchant premises, a time range during which the content is communicated, and a target audience for the content communicated.

The CMS may be implemented as a Web application for creating and managing HTML content. The content associated with a content bubble may be stored on the wireless handset, stored locally on system located at the merchant premises, or stored on a server remote from the wireless handset and the merchant premises. Content may be buffered on the wireless handset, in a merchant system, or on a remote server.

Figure 5:
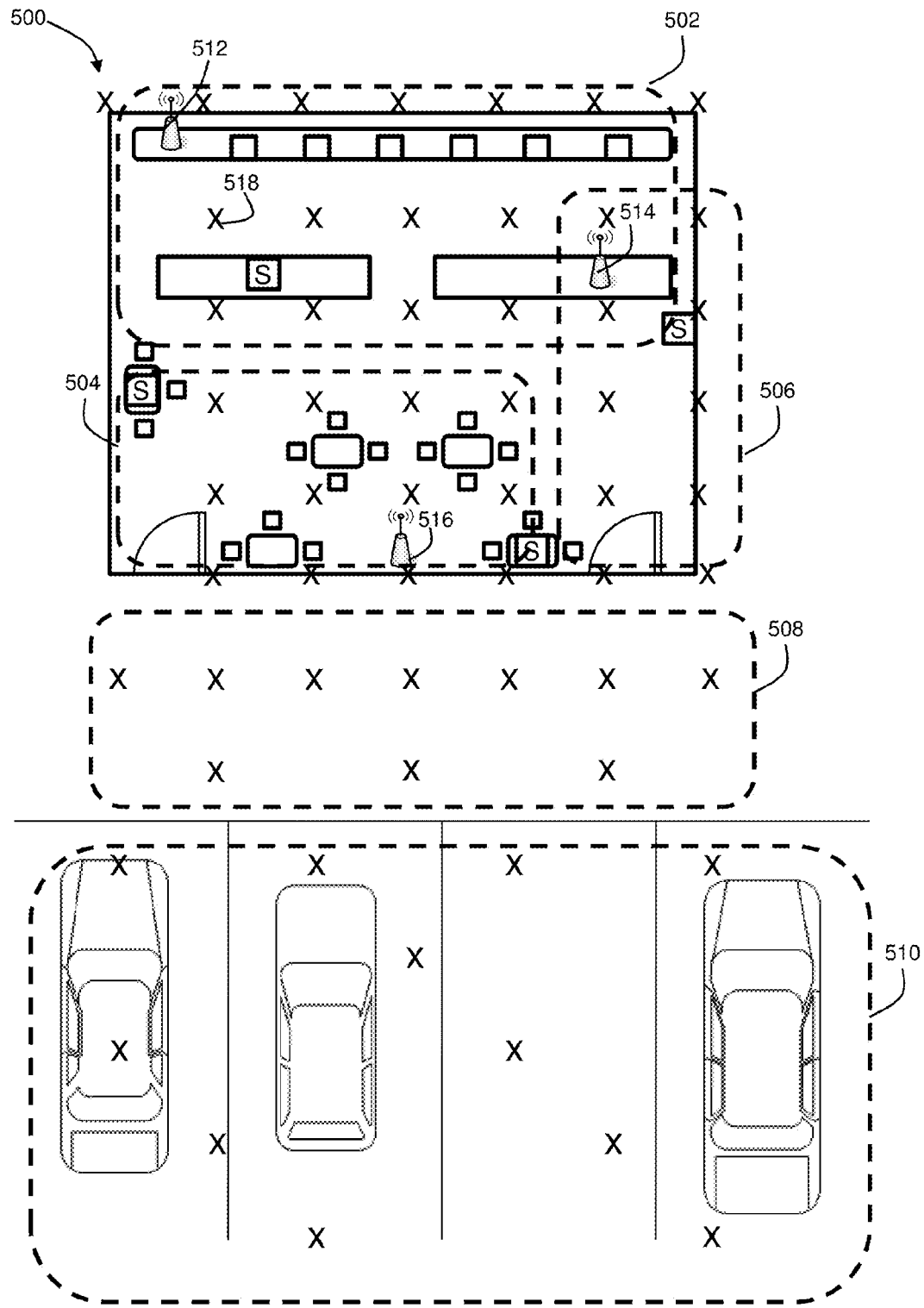
FIG. 5 shows an illustrative content bubble layout relative to a merchant premises.

Referring to FIG. 5, an illustrative content bubble layout 500 is shown relative to an illustrative merchant premises site map. The merchant has defined content bubbles 502, 504, and 506 within the merchant premises. The merchant has additionally defined content bubble 508 surrounding the walkway proximate to the merchant premises and content bubble 510 surrounding a parking lot area proximate to the merchant premises. When a wireless handset enters one of the content bubbles, the wireless handset receives signals from one or more of beacons 512, 514, and 516. The RSSI received by the wireless handset from the beacons is transmitted to the server, which compares the RSSI from the one or more beacons to the VRPs in the VRP grid. Each VRPs is indicated with an X in FIG. 5. For example, the X indicated at 518 is a VRP. In one embodiment, the wireless handset may be determined to be located at the VRP having an RSSI profile for one or more beacons that most closely resembles the RSSI data received by the wireless handset. If the wireless handset is determined to be within, for example, content bubble 516, the server may send content associated with content bubble 516 to the wireless handset. If the position of the wireless handset changes, the new RSSI data received by the handset is sent to the server. For example, if the wireless handset has entered content bubble 502, the server may send new content to the wireless handset that the merchant has associated with content bubble 502. In addition to filtering content by location according to the content bubble definitions established by the merchant, the server may also filter location according to a time range or user attributes the merchant has associated with the content.

Users may provide feedback regarding content that is recorded and used to continually update the Content Management System. With respect to the content bubbles, user feedback communicated to the Merchant's CMS includes, but is not limited to, information such as CPM (cost per thousand), CPC (cost per click), and CTR (click through rate). Thus, the user feedback from an illustrative advertising campaign or promotion can effectively be tracked in real-time on the Merchant's CMS.

Additionally, the user feedback may also be stored and/or buffered by the Group Profile layer described below.

Group Profile

The Group Profile layer provides a repository for the user preference profile and associates the user's group attributes with one or more merchant defined groups. The user preference profile may associate the user with groups selected or defined by the user or another entity. The process of using "group" dynamics provides a means for filtering and a means for anonymizing user information.

In operation, the MADGUI Application Framework relies on serving up the most relevant link content and/or endpoint content to each user as a function of user preference profile, location, and time.

The Group Profile layer relies on a user-preference profile, so it gathers user-defined input. It enables the user to generate user-defined or user-selected groups and enables the merchant to generate merchant-defined groups. The Group Profile layer also enables the merchant to associate group attributes with a user-preference profile, such as an attribute provided to the merchant by the user. Content is filtered based on the user preference profile, group attributes, or combination thereof. The Group Profile layer provides session-based control and supports the weighting of user preference profile, group attributes, or the combination thereof according to user feedback. The location of the wireless handset relative to the merchant premises may be logged. Additionally, a search string may be geocoded according to location and time and used to update the user-preference profile, group attributes, or combination thereof. Users may be able to share feedback with other users or similar users from similar groups. Feedback may also be tracked according to content visits as a function of location, time, and user preference profile. The merchant may produce and generate content and applications that are location-centric and merchant specific.

The Group Profile layer obtains real-time feedback through the MADGUI interface. The MADGUI interface provides a dynamic portal page that changes as a function of location.

Mobile Autonomous Dynamic Graphical User Interface (MADGUI)

The MADGUI is the portal page for the MADGUI Application Framework and is an application. The MADGUI portal page enables the merchant to serve up links automatically and without user input. Additionally, the MADGUI provides search engine like results without requiring user input and gives results based on location, time and user preference profile.

Figures 6A, 6B:
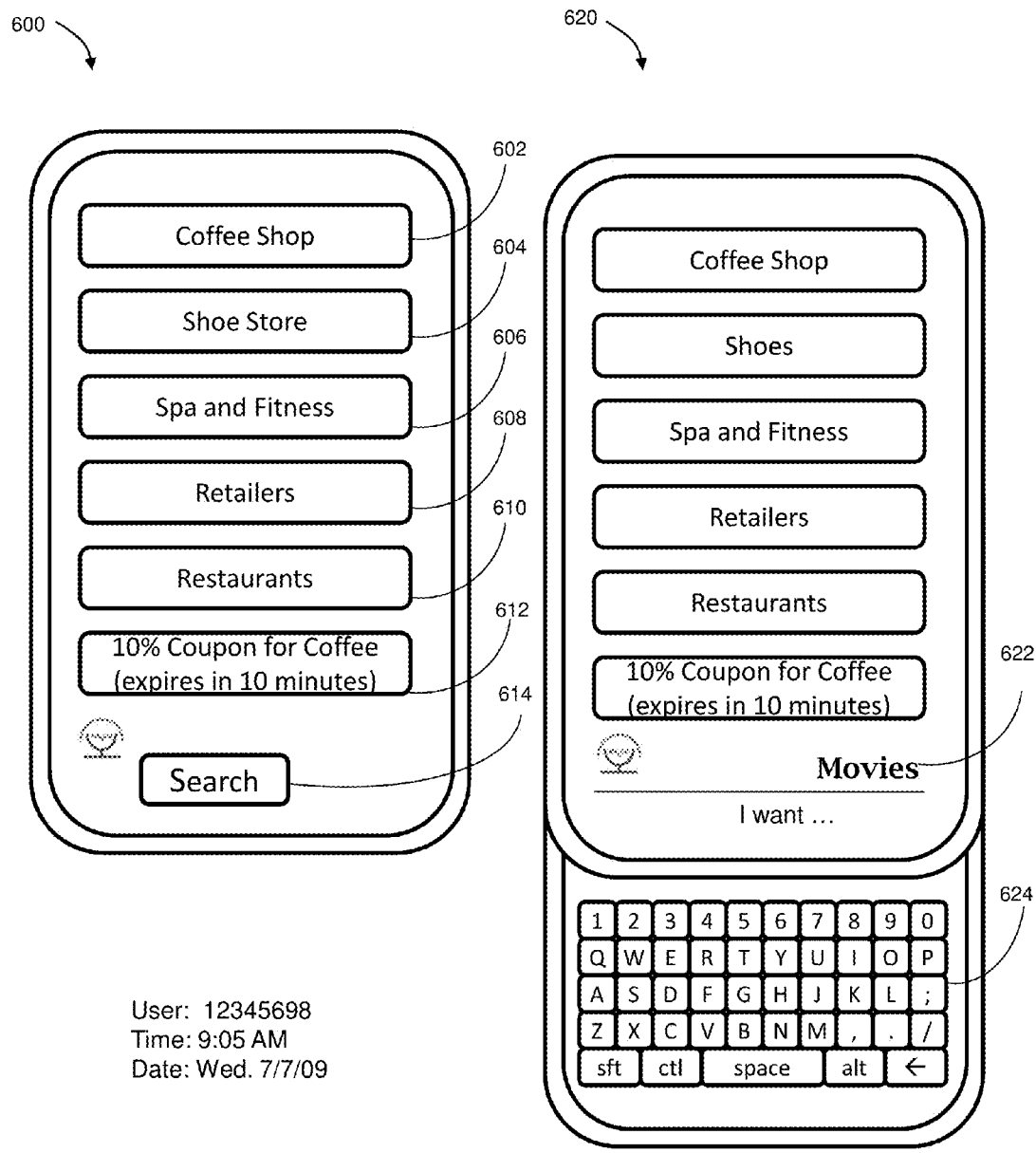
FIGS. 6A-6B show an illustrative content interface.

Referring to FIG. 6A, an illustrative MADGUI 600 is shown on a wireless handset. FIG. 6A includes five ranked content links 602-610 provided by the server to the wireless handset in accordance with the location of the wireless handset relative to the merchant premises, time range and one or more attributes provided via the user preference profile. Content item 612 is an endpoint link which is a sponsored advertisement, banner ad, mobile ad, a mobile coupon, or other such advertisement. Alternatively, the sixth link may simply provide a sixth ranked link according to location, time and user preference profile. The user may select search button 614 if the user wishes to see additional content beyond that provided in the received content links. Pressing the search button allows the user to enter information in a search field. Referring to FIG. 6B, search field 622 is shown. The user has entered text in the search field using keypad 624. The keypad may be a physical interface, as shown, or a touchscreen or other interface configured to receive text, numbers, characters, or a combination thereof. After the user enters text, the search text is sent to the server, which filters merchant content by the search text. The server may additionally filter content by location, time range, and or user attributes. For example, in FIG. 6B, the user has entered the search text "Movies." The server may deliver content corresponding to movie showtimes in a time range following the current time, for example, movies showing in a time range between the current time and two hours after the current time. The find process can also include cookie tracking features that are well known in the art of searching.

The illustrative screenshot presented above can be activated when the user activates a Merchant application on the user's handset or similar wireless device. The Merchant Application then proceeds to grab RSSI readings and communicate these readings to the Location Positioning Engine residing on a local intranet.

The illustrative MADGUI portal page is then served up to the user based on location, time and user preference profile. In a second illustrative embodiment, the merchant activates the MADGUI application on the user handset. In a third illustrative embodiment, the MADGUI application is activated by the carrier or service provider; thus, the MADGUI may be selected by the carrier as a portal search application that is running in the background or foreground of a user's handset. In a fourth illustrative embodiment, the MADGUI is an application that is pre-loaded on a handset and is a user selected portal page so that the MADGUI application is enabled when the user opens the browser, or when a user opens an Application such as the MADGUI application.

Applications

As previously mentioned, the foundational application for the MADGUI Application Framework is the MADGUI. The MADGUI portal page has links to content including Applications. The MADGUI Application Framework Applications operate in conjunction with the MADGUI Application Framework. Four illustrative niche applications for the deployment of the MADGUI Application Framework are identified below.

Casino Applications.

A variety of casino applications have been identified including, but not limited to:

Locating the player;

Triggering changes to a display based on the location of the player;

Incorporating player reward card features onto a player's handset and converting loyalty program points to rewards in real-time;

Changing signs and/or TV channels based on a user's location;

Informing casino host that player is leaving the premises; and

Routing players to locations with little or no activity and/or to move players away from locations with too much activity (Casino Route Management).

Food & Beverage Applications.

An illustrative set of Food & Beverage applications is described including, but not limited to:

Communicating "real-time" coupons with shortened expiration periods, e.g. offer expires in 10 minutes;

Communicating 'Specials' to a particular group of users;

Tracking historical order and generating an ordering menu specific to the user;

Minimizing wait time and staffing requirements because ordering is off-loaded to user.

Retail Applications.

A variety of retail applications have been identified that include, but are not limited to:

Enabling a merchant to change a price tag for a particular customer or group, thereby allowing a merchant to move more inventory.

Enabling automated list generation for the user based on historical transactions, e.g. a shopping list;

Enabling a merchant to support reverse auctions with the merchant premises.

Free-Trade-Zone Applications.

Free-Trade-Zone content can be supported such as ad-based Cost-Per-Click advertisements, targeted advertisements and targeted coupons. The handset may also convert a handset to a remote control for a TV or other display.

The MADGUI Application Framework is flexible and may be deployed as a middleware platform. This solution provides a platform to communicate highly targeted content to a wireless handset based on user preference profile, location, and time. Additionally, this solution supports user generated content and sharing this content as a function of user preference profile, location and time.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A system for delivering content within a boundary, comprising:
    a plurality of beacons, each beacon among the plurality of beacons configured to transmit a signal containing identifying information;
    a location positioning module configured to receive a beacon signal data communication from a wireless device, the beacon signal data including a beacon received signal strength and a beacon identification for each beacon signal received at the wireless device;
    the location positioning module configured to receive a plurality of measured reference points that include a measured beacon identifier and a measured signal strength;
    the location positioning module configured to use the measured reference points to generate a plurality of calculated signal strength values for at least one detected beacon, wherein some of the calculated signal strength values are associated with at least one geographic boundary;
    the location positioning module further configured to determine the location of the wireless device by comparing the beacon signal data to the plurality of calculated signal strength values; and
    a networked component configured to transmit to the wireless device at least one content item associated with the geographic boundary when the wireless device is within the geographic boundary.

2. The system of claim 1, wherein the content item transmitted from the networked component to the wireless device is associated with at least one user attribute associated with the wireless device.

3. The system of claim 1, wherein the content item transmitted from the networked component to the wireless device is associated with at least one time frame, and the content item is transmitted within the time frame.

4. The system of claim 1, wherein the content item is a link to another content item.

5. The system of claim 1, wherein the content item is an application.

6. The system of claim 1, wherein the boundary delineates all or part of a merchant premises.

7. The system of claim 1, wherein the boundary delineates an area proximate to a merchant premises.

8. A system for delivering content within a boundary, comprising:
    a plurality of beacons, each of the beacons configured to transmit a signal containing identifying information;
    a location positioning module receiving a beacon signal data communication, wherein the beacon signal data including a beacon received signal strength and a beacon identification of each beacon signal received by a wireless device;
    the location positioning module receiving a plurality of measured reference points that include a measured beacon identifier and a measured signal strength;
    the location positioning module using the measured reference points to generate a plurality of calculated signal strength values for at least one detected beacon, wherein some of the calculated signal strength values are associated with at least one geographic boundary;
    the location positioning module determining the location of the wireless device by comparing the beacon signal data to the plurality of calculated signal strength values; and
    the location positioning module transmitting to the wireless device at least one content item associated with the geographic boundary when the wireless device is within the geographic boundary.

9. The system of claim 8, wherein the content item transmitted to the wireless device is associated with at least one user attribute associated with the wireless device.

10. The system of claim 8, wherein the content item transmitted from the location positioning module to the wireless device is associated with at least one time frame, and the content item is transmitted within the time frame.

11. The system of claim 8, wherein the content item is a link to another content item.

12. The system of claim 8, wherein the content item is an application.

13. The system of claim 8, wherein the boundary delineates all or part of a merchant premises.

14. The system of claim 8, wherein the boundary delineates an area proximate to a merchant premises.

15. A method for delivering content within a boundary, comprising:
    receiving at a location positioning module a beacon signal data communication from a wireless device, the beacon signal data including a beacon received signal strength and a beacon identification for each beacon signal received at the wireless device;
    receiving at the location positioning module a plurality of measured reference points that include a measured beacon identifier and a measured signal strength;
    enabling the location positioning module to use the measured reference points to generate a plurality of calculated signal strength values for at least one detected beacon, wherein some of the calculated signal strength values are associated with at least one geographic boundary;

determining with the location positioning module a location of the wireless device by comparing the beacon signal data to the plurality of calculated signal strength values; and transmitting to the wireless device from a networked component at least one content item associated with the geographic boundary when the wireless device is within the geographic boundary.

16. The method of claim 15, further comprising transmitting to the wireless device at least one content item associated with at least one user attribute associated with the wireless device.

17. The method of claim 15, further comprising transmitting to the wireless device at least one content item associated with a time frame, wherein the content item is transmitted within the time frame.

18. The method of claim 15, wherein the content item is a link to another content item.

19. The method of claim 15, wherein the content item is an application.

20. The method of claim 15, wherein the boundary delineates all or part of a merchant premises.

* * * * *